United States Patent [19]

Picone et al.

[11] Patent Number: 5,293,452
[45] Date of Patent: Mar. 8, 1994

[54] VOICE LOG-IN USING SPOKEN NAME INPUT

[75] Inventors: Joseph Picone; Barbara J. Wheatley, both of Plano, Tex.

[73] Assignee: Texas Instruments Incorporated, Dallas, Tex.

[21] Appl. No.: 724,298

[22] Filed: Jul. 1, 1991

[51] Int. Cl.5 .............................................. G10L 9/00
[52] U.S. Cl. ................................... 395/2.59; 395/2.65
[58] Field of Search ..................................... 381/41–45; 395/2.59, 2.65

[56] References Cited

U.S. PATENT DOCUMENTS

| | | | |
|---|---|---|---|
| 4,752,958 | 6/1988 | Cavazza et al. | 381/42 |
| 4,769,844 | 9/1988 | Fujimoto et al. | 381/42 |
| 4,977,599 | 12/1990 | Bahl et al. | 381/41 |
| 5,054,083 | 10/1991 | Naik et al. | 381/42 |
| 5,212,730 | 5/1993 | Wheatley et al. | 381/43 |

OTHER PUBLICATIONS

Juang et al., "Recent Developments In the Application of Hidden Markov Models to Speaker-Independent Isolated Word Recognition", PROC. IEEE ICASSP, Mar. 1985, pp. 9–12.

*Primary Examiner*—Michael R. Fleming
*Assistant Examiner*—Michelle Doerrler
*Attorney, Agent, or Firm*—Robert L. Troike; Leo N. Heiting; Richard L. Donaldson

[57] ABSTRACT

A voice log-in system is based on a person's spoken name input only, using speaker-dependent acoustic name recognition models in a performing speaker-independent name recognition. In an enrollment phase, a dual pass endpointing procedure defines both the person's full name (broad endpoints), and the component names separated by pauses (precise endpoints). An HMM (Hidden Markov Model) recognition model generator generates a corresponding HMM name recognition model modified by the insertion of additional skip transitions for the pauses between component names. In a recognition/update phase, a spoken-name speech signal is input to an HMM name recognition engine which performs speaker-independent name recognition—the modified HMM name recognition model permits the name recognition operation to accommodate pauses between component names of variable duration.

17 Claims, 2 Drawing Sheets

FIRST ENDPOINTING PASS

SECOND ENDPOINTING PASS

VOICE LOG-IN USING SPOKEN NAME INPUT

TECHNICAL FIELD OF THE INVENTION

The invention relates generally to voice recognition, and more particularly relates to a voice log-in method for granting a person access based on recognition of that person's spoken name, without the use of additional codes or passwords. In even greater particularity, voice log-in is implemented using an HMM (Hidden Markov) modeling technique in which, to accommodate unpredictable variations in the duration of pauses between a person's first and last name, the full-name models for the spoken rendition of a person's name are augmented by: (a) inserting skip transitions for pauses between the name-part utterances within the full-name HMM model, or (b) including nonspeech HMM models for pauses between the subpart or name-part HMM models in a full-name FSA (finite state automaton) model.

BACKGROUND OF THE INVENTION

Speaker recognition generally includes the tasks of speaker identification and speaker verification: speaker identification involves labeling an unknown voice as one from a set of known voices, while speaker verification involves determining whether an unknown voice matches the known voice of a speaker whose identity is being claimed. In particular, speaker identity verification based on a person's voice is of considerable interest for providing telephone access to such services as banking transactions, credit card verification, remote access to dial-up computer databases.

The specific problem for which the invention has application is providing verified access to medical records databases for health care providers. For example, a voice log-in system would be used by doctors to obtain verified access to a number of medical databases at different health care institutions.

Two approaches to voice verification technology have been used: voice/mechanical and total voice. In a voice/mechanical system, a user manually enters a digit code and then speaks a voice password—the voice password is compared with a reference acoustic recognition model retrieved based on the secret code. In a total voice system, a user speaks a digit code—speaker-independent digit recognition is used to recognize the digits, and then a reference acoustic recognition model is loaded based on the recognized digit string, and voice verification is performed.

The total voice system can be described as a template-based, fixed-text speaker verification task. It includes the subtasks: (a) enrollment—creating a reference template composed of a set of speech features, as a function of time, associated with the fixed-text digit code for each valid user; (b) verification—selecting an appropriate reference template based on speaker-independent recognition of the digit code, and comparing input speech with reference templates at equivalent points in time, with a decision being based on similarity between input and reference, integrated over time; and (c) reference update—adapting the reference templates to accommodate changes in a valid user's speech after successful verification.

The enrollment procedure builds an initial reference template for a speaker by capturing the digit code, typically by examining the speech energy profile and determining the end points in time. For each successful verification, the dynamic reference updating procedure averages the feature sets associated with the reference template and the input speech, and the reference template is updated accordingly, thereby accommodating changes in a persons speech input as familiarity with the system is achieved.

Both the voice/mechanical and the total voice speaker verification systems are disadvantageous in that each requires the use of a specific digit code (either entered or spoken). In the medical records database application, such a requirement is problematic to the point of impracticality. Doctors and other health care providers typically see patients at a number of hospitals, each of which has its own medical records database system. These systems typically assign each user a unique identification code, requiring each health care provider to remember a different identification code for each institution and database system.

Accordingly, a need exists for a speaker verification system that is not based on the spoken input of an identification code.

SUMMARY OF THE INVENTION

The invention is a voice log-in technique in which access to, for example, a medical records database, is granted based on the computerized recognition of a person's spoken name. In the exemplary voice log-in system, each person's spoken name input (i.e., a spoken rendition of such person's full name) is converted into a Hidden Markov Model (HMM) that is augmented to accommodate unpredictable variations in the duration of pauses in a person's spoken name.

In one aspect of the invention, the voice log-in technique includes: (a) for each person to be enrolled, creating a name recognition model using a spoken name input; and (b) storing the name recognition model for each person enrolled in a name recognition model database. Then, each time a person attempts voice log-in, the spoken name input is compared with the stored name recognition models, and if a pattern match is found, the person is logged in to the system.

In an exemplary embodiment of the invention, enrollment is accomplished using HMM name recognition modeling to create full-name HMM models. Enrollment includes a dual-pass endpointing procedure in which, for each spoken name input, (a) a first endpointing pass uses broad endpoint criteria to define the beginning and end of a full-name utterance, and then (b) making a second endpointing pass using precise endpoint criteria to locate the precise endpoints within such full-name utterance that delimit constituent name-part utterances and the associated pause(s).

Based on such dual-pass endpointing, the full-name HMM model is augmented to make any pause(s) between the name-part utterances optional, such that the name recognition modeling technique accommodates variations in the length, or elimination, of any pauses in the spoken name input. The recommended approach is to insert skip transitions into the full-name HMM model at the point of any pause(s). An alternative approach is to create a full-name FSA model whose observations are the subpart or name-part HMM models (which correspond to the constituent name-part utterances) and which includes nonspeech HMM models at the pauses between name-part utterances.

The dual-pass endpointing procedure makes use of an energy-based utterance detection algorithm. Using the RMS speech energy of the spoken name input, the procedure computes (a) a speech utterance level parameter, using fast upward adaptation and slow downward adaptation, and (b) a noise level parameter, using slow upward adaptation and fast downward adaptation. From the speech utterance level estimate, the noise level estimate, and a predetermined minimum RMS speech energy level, an utterance detection threshold is determined.

The beginning and end of the full-name utterance is declared when the associated RMS energy remains above/below the utterance detection threshold for a specific duration (for example, 60 Msec). For the first endpointing pass, the full-name utterance is endpointed with a relatively large value for the utterance separation duration (for example, 1500 msec), while for the second endpointing pass, a small value for the utterance separation duration (for example, 40 msec) is used to obtain the precise endpoints that define the name-part utterances and intervening pauses.

The technical advantages of the invention include the following. The voice log-in system uses only the user's spoken name as the speaker recognition protocol, accomplishing both speaker identification and speaker verification. The dual-pass endpointing procedure locates the precise endpoints that define name-part utterances and associated pauses. Dual-pass endpointing, and in particular the identification of the precise endpoints that define name-part utterances and pauses, allows the voice log-in system to accommodate pauses between a person's component names that are variable in duration through the insertion of additional HMM skip transitions or nonspeech HMM models.

BRIEF DESCRIPTION OF THE DRAWINGS

For a more complete understanding of the invention, and for further features and advantages, reference is now made to the following Detailed Description of an exemplary embodiment of the invention, taken in conjunction with the accompanying Drawings, in which.

DETAILED DESCRIPTION OF THE INVENTION

The Detailed Description of an exemplary embodiment of the voice log-in method is organized as follows:
1. Voice Log-In
  1.1. HMM Enrollment
  1.2. HMM Recognition/Update
2. HMM Enrollment
  2.1. Dual-Pass Endpointing
  2.2. Inserting Skip Transitions
  2.3. Including Nonspeech Models
  2.4. Alternative Endpointing Procedures 3. Conclusion The exemplary voice log-in system is used in connection with a medical records database in which health care providers obtain access to the database by speaking their name.

1. Voice Log-In

The voice log-in system implements a computerized voice recognition system in which speaker-dependent acoustic recognition models of a person's spoken name input (i.e., a spoken rendition of such person's full name) are created for use in performing speaker-independent name recognition.

Figure 1:
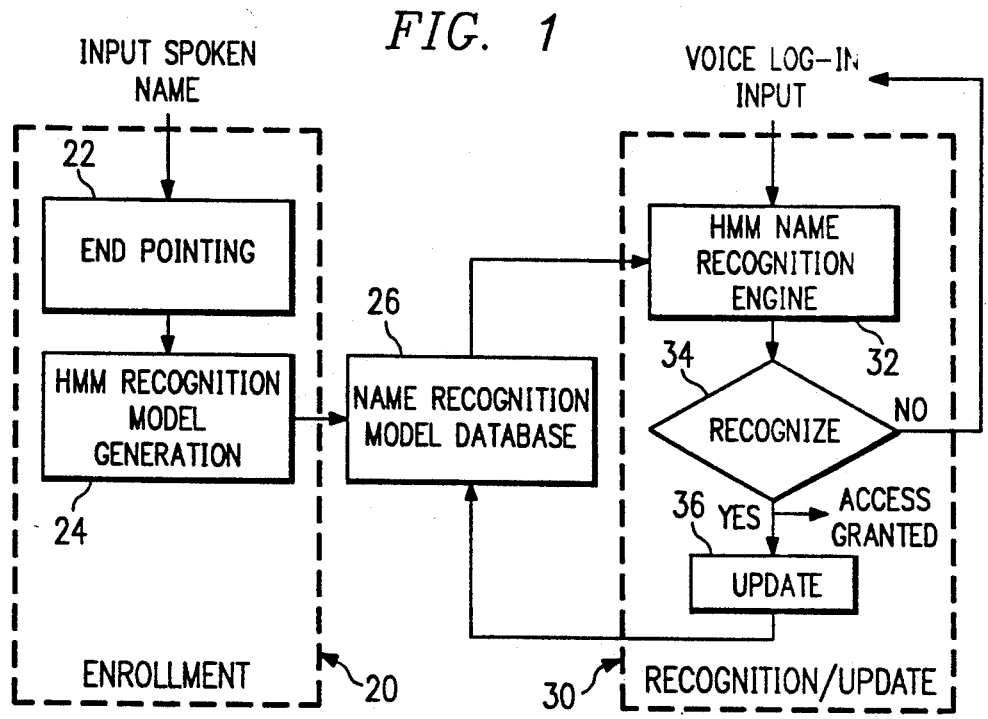
FIG. 1 is a functional illustration of the voice log-in system, including enrollment and recognition/update.

FIG. 1 illustrates the exemplary voice log-in system, which includes an enrollment phase 20 and a recognition/update phase 30. The exemplary voice log-in system does not require any hardware beyond that customary for computer voice applications.

Conventional HMM technology is used in both phases. In general, HMM builds probablistic models of a speech signal that describe its time-varying characteristics. It is a doubly stochastic process in that it has an underlying stochastic process that is not observable (hence the term hidden), but can be observed through another stochastic process that produces a sequence of observations.

The conventional HMM process consists of the following general operations: (a) optimize the model parameters to best describe the observed sequence (Training), (b) given an observation sequence, choose a state sequence that is optimal according to some predefined criterion, such as maximization of the globally best path (known as the Viterbi algorithm), and (c) given an observation sequence and the model, compute the probability of the observation sequence (Scoring).

1.1. HMM Enrollment

Referring to FIG. 1, In the enrollment phase, each individual to be enrolled speaks his/her full name, indicating to the system that such spoken name input (i.e., the spoken rendition of such person's full name) is for enrollment purposes.

The first step in this speaker-dependent enrollment is to perform an endpointing (22) procedure with the spoken name input to define a representative full-name utterance.

The full-name utterance is input to an HMM name recognition model generator (24) that generates a corresponding reference HMM model, which is stored in a name recognition model database (26). This database is then accessed during the recognition/update phase in connection with voice log-in operations.

1.2. HMM Recognition/Update

Referring to FIG. 1, in the recognition/update phase, a person desiring access to the medical records database logs in to the system by speaking his/her full name. This spoken name input is applied to an HMM name recognition engine (32) which performs speaker-independent name recognition (34). That is, the HMM name recognition engine compares the spoken name input with the reference HMM models stored in the name recognition model database (26), seeking a pattern match (i.e., recognition).

If a pattern match is not found, the person may be asked to repeat his/her name.

If a pattern match is found, the system indicates that log-in is complete, and access to the medical records database is granted. In addition, a conventional dynamic updating procedure (36) averages the spoken name input and the reference HMM model to improve performance of the voice log-in system over time.

2. HMM Enrollment

For the exemplary voice log-in system, the HMM enrollment phase provides a procedure for augmenting the HMM name recognition modeling technique to accommodate pauses between a person's names that are unpredictable in duration.

This procedure takes account of the natural tendency of a person to speak his or her full name more rapidly with continued use of, and familiarity with, a voice recognition system. Thus, during enrollment people will tend enunciate the different component names (for example, first and last name) with a clearly delineated separation, but with continued use they will customarily compress their spoken name input to the system, significantly reducing or eliminating the duration of the pause between component names. Such variations in the duration of pauses between component names can not be accommodated by the update procedure because the update procedure does not change the structure of the name recognition model.

Two procedures are described for augmenting the reference full-name models to accommodate pauses of variable duration, both of which rely on a dual-pass endpointing procedure for precisely identifying the separation between component names. Alternatively, other endpointing techniques may be used to identify pauses between name-parts (see, Section 2.4).

2.1 Dual-Pass Endpointing

Figure 2A:
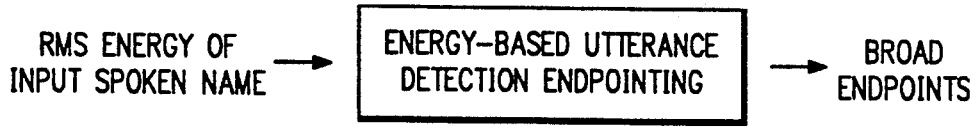
FIGS. 2a and 2b illustrate dual-pass endpointing.
Figure 2B:
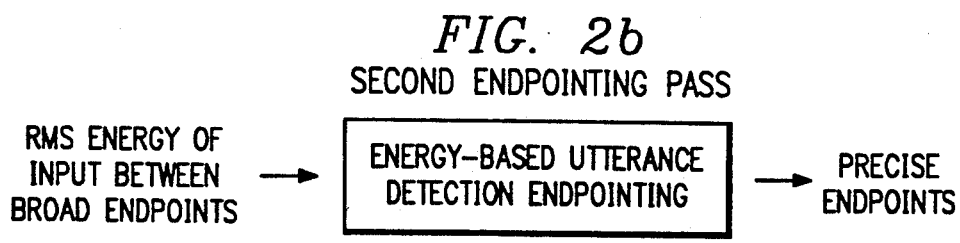
Figure 2C:
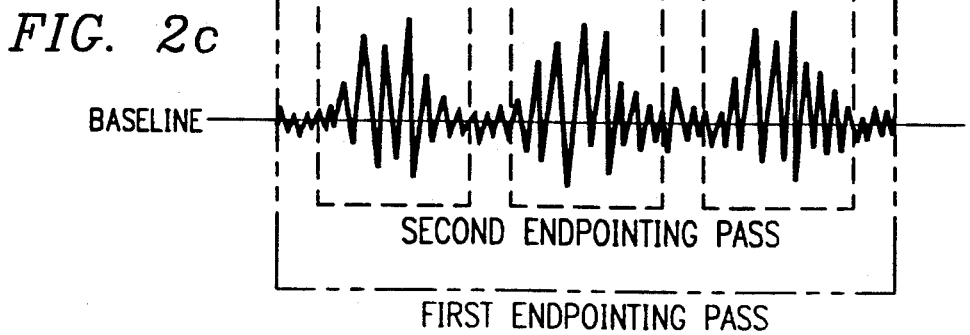
FIG. 2c illustrates dual-pass endpointing in connection with an exemplary speech signal for a spoken name including pauses between name-parts.

FIGS. 2a–2c illustrate the dual-pass endpointing procedure. For each spoken name input (i.e., a spoken rendition of a person's full name), the dual-pass endpointing procedure uses two endpointing passes—broad and precise—to precisely define a corresponding full-name utterance and its constituent name-part utterances (and associated pauses) by locating precise utterance endpoints, and thereby identifying the pauses between name-part utterances—pauses that generally, but not necessarily, occur between the components of a person's name.

Both passes make use of an energy-based utterance detection algorithm. For each enrollment, the RMS speech energy of the spoken name input is computed every frame (typically 20 msec). Using the RMS speech energy in the spoken name input, the utterance detection algorithm estimates (a) a speech utterance level parameter, using fast upward adaptation and slow downward adaptation, and (b) a noise level parameter, using slow upward adaptation and fast downward adaptation.

From the speech utterance level estimate, the noise level estimate, and a predetermined minimum RMS speech energy level, an utterance detection threshold is determined. The beginning of the full-name utterance is declared when the RMS energy remains above the utterance detection threshold for a specific duration (for example, 60 msec)—************—the full-name utterance input corresponds to the spoken full name input, and is made up of name-part utterances and associated pauses. The end of the full-name utterance is declared when (a) the RMS energy remains below the utterance detection threshold for a specified duration (for example, 60 msec), and (b) no new utterance beginning is detected for a specified utterance separation duration (for example, 1000 msec).

Referring to FIGS. 2a and 2b, in the first endpointing pass, the full-name utterance is endpointed using a relatively large value for the utterance separation duration (for example, 1500 msec). In the second endpointing pass, the full-name utterance delimited by the broad endpoints obtained in the first pass is endpointed again using a small value for the utterance separation duration (for example, 40 msec) to obtain the precise endpoints that define the constituent name-part utterances and the associated pause(s).

Referring to FIG. 2c, dual-pass endpointing is illustrated in connection with an exemplary speech signal. The first endpointing pass uses broad endpointing criteria to identify a person's full name (i.e., the full-name utterance), which in this example is assumed to include three name-part utterances that correspond to three component names. Then the second endpointing pass uses precise endpointing criteria to define the three component names in terms of associated name-part utterances separated by pauses.

2.2. Inserting Skip Transitions

The recommended procedure for augmenting a normal full-name HMM model to accommodate pauses of variable duration within the spoken name input is to insert skip transitions in the HMM model for the pauses.

The HMM technique represents speech using models with a finite number of different states. Each state is capable of generating either a finite number of outputs (the vector quantization approach) or a continuum of outputs (the continuous distribution approach). For the exemplary embodiment, the continuous distribution approach was used.

Figure 3A:
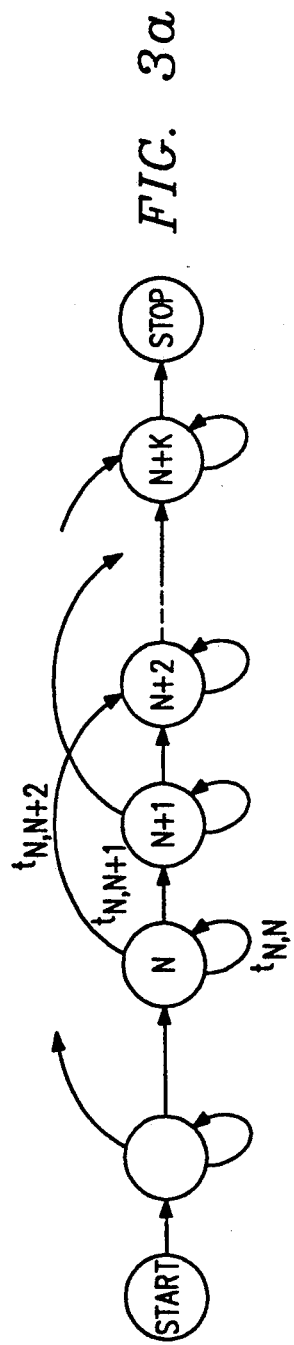
FIG. 3a illustrates a general HMM recognition model structure.

FIG. 3a illustrates a conventional HMM model structure. This left-to-right model structure has a single START state and a single STOP state, and a total of M states in between. A state is typically defined every 20 ms.

At discrete intervals of time, the system transitions from one state to another, each state producing an output. A state N has (a) transitions $t_{N,N}$ to the same state, (b) transitions $t_{N,N+1}$ to the adjacent state N+1, and (c) skip transitions $t_{N,N+2}$ to a non-adjacent state N+2.

These transitions allow for alternate paths through the model, depending on the input. This feature of the HMM model accommodates temporal variations in the speech signal. However, it does not accommodate unpredictable variations in the duration of pauses between component names as a person speaks his or her name during voice log-in.

To accommodate pauses of variable duration, the exemplary voice log-in system augments the structure of a normal full-name HMM model by inserting appropriate skip transitions between the constituent name-part utterances separated by pauses.

Figure 3B:
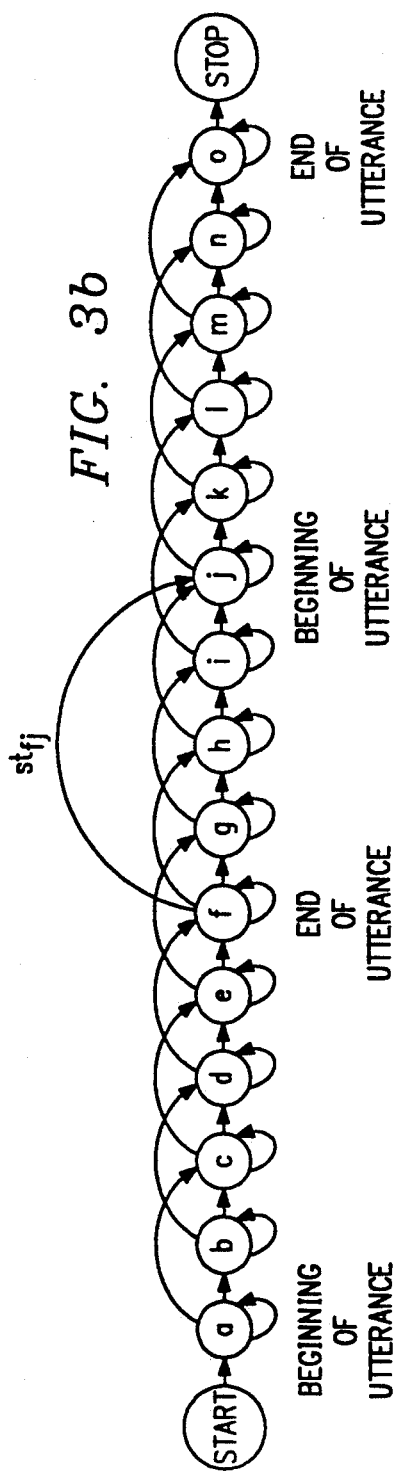
FIG. 3b illustrates an exemplary HMM name recognition model ,including the insertion of an additional skip transition to accommodate a pause of variable duration between name-parts.

FIG. 3b illustrates this augmented HMM modeling technique. First, a standard HMM name recognition model is created for the full-name utterance that represents the person's full name, i.e., the spoken name input from the first utterance beginning to the last utterance end detected in the first endpointing pass. This standard HMM model is represented by states A through 0, with three transition from each state.

Second, for each internal utterance end and utterance beginning, determined by the precise endpoints detected in the second endpointing pass, an additional skip transition $st_{fj}$ is inserted into the HMM name recognition model, where $st_{fj}$ is a skip transition from state f corresponding to the end of the first name-part utterance (for example, the first name) to a state j corresponding to the beginning of the second name-part utterance (for example, the second name). That is, the skip transition $st_{fj}$ encompasses the pause, represented by states g/h/i, between the two name-part utterances that form the person's full name.

2.3. Including Nonspeech Models

An alternate procedure for accommodating pauses of variable duration within the spoken name input involves: (a) creating separate name-part HMM models for the constituent name-part utterances, (b) creating a model for the full-name which is a full-name FSA (finite state automaton) model whose observations are the name-part HMM models, and (c) augmenting the FSA model by including nonspeech HMM models between the name part models.

The separate name-part HMM models are generated for each utterance detected in the second endpointing pass. A full-name model is then constructed creating an FSA model whose observations are these name-part HMM models. To accommodate optional pauses between name-part utterances, self-transitions whose observations are nonspeech HMM models are inserted in the full-name FSA model at each internal state in the FSA.

The name-part models are conventional HMM models (i.e., with no additional endpoint-based skip transitions) that represent the acoustic and temporal features of a name-part utterance defined in an endpointing procedure. The name-part utterances identified by the second endpointing pass correspond to acoustically-defined components of the name, which do not necessarily correspond to the linguistically-defined name components (such as first and last name).

Figure 4:
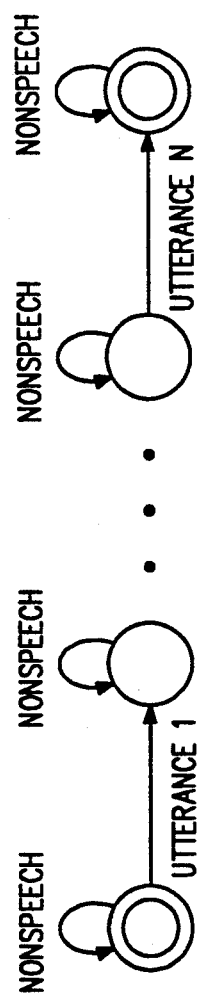
FIG. 4 illustrates an exemplary full-name FSA model, which represents the full-name in terms of the name-part HMM models and nonspeech HMM models using a finite state machine.

FIG. 4 illustrates an exemplary full-name FSA model whose observations are name-part HMM models and nonspeech HMM models. The full-name FSA utterance model contains N transitions, each corresponding to an name-part HMM model, where the second endpointing pass identified N acoustically-defined name-part utterances of the full-name utterance delimited in the first endpointing pass.

Nonspeech is modeled by one or more HMM models representing silence and/or various nonspeech sounds. The optional nonspeech self-transitions between name-part HMM models accommodate optional pauses between name-part utterances in the full-name utterance.

To successfully recognize the name using such a full-name FSA model, the recognizer recognizes each name-part utterance in succession, with optional pauses recognized between utterances.

2.4. Alternative Endpointing Procedures

The exemplary voice log-in system uses energy-based endpointing. As an alternative, endpointing could be implemented using a spectral-based scheme based on HMM technology or neural networks.

Energy-based endpointing is a mature technology which is straightforward and computationally efficient. However, it is less accurate than spectral-based endpointing—thus the use in the exemplary voice log-in system of a dual-pass endpointing procedure.

Spectral-based endpointing can be more accurate than energy-based endpointing because it makes use of additional information to separate speech and noise. However, spectral-based endpointing is at this time a relatively immature technology.

HMM-based endpointing would involve using an HMM recognition engine to align the input with speech and/or non-speech models. Neural net-based endpointing would involve training a neural net classifier on speech and/or non-speech, and then using the neural net classifier to segment the input—a neural net is a statistically optimal classifier, although methods of accommodating temporal constraints in neural nets are not well understood.

3. Conclusion

Although the Detailed Description of the invention has been directed to certain exemplary embodiments, various modifications of these exemplary embodiments, as well as alternative embodiments, will be suggested to those skilled in the art. For example, the invention has general applicability to systems that provide verified access authorization based only on a spoken name input, without the additional entry of any account or other codes. A security feature may be added to these systems by performing a conventional voice verification pass as an additional step in the voice log-in operation. Also, a statistical measure of the speaker's instantaneous fundamental frequency could be added to the feature set used in recognition to achieve improved identification and/or verification performance.

It is to be understood that the invention encompass any modifications or alternative embodiments that fall within the scope of the appended claims.

What is claimed is:

1. A voice log-in method for logging in to a system based on computerized recognition of a spoken name input comprising the steps:

creating an augmented name recognition model from the spoken name input for each person to be enrolled, wherein said augmented name recognition model includes constituent name-part utterances, and also includes any pause in the spoken name input, and wherein said augmented name recognition model represents a portion of said constituent name-part utterances as optional, thereby accommodating elimination of optional name-part utterances, and wherein said pause is also represented as optional, thereby accommodating unpredictable variations in said pause, and wherein said creating name recognition models is accomplished using HMM (Hidden Markov Modeling) to create HMM name recognition models;

storing said name recognition model for each person enrolled in a name recognition model database;

comparing the spoken name input with the stored name recognition models each time a person seeks access to the system by voice log-in; and logging a person in to the system if a pattern match is found, during said comparing, between the spoken name input and one of the stored name recognition models.

2. The voice log-in method of claim 1, wherein the step of creating augmented name recognition models comprises the substeps:

receiving the spoken name input for each person to be enrolled;

performing an endpointing procedure on the spoken name input to delimit the beginning and end of a corresponding full-name utterance, and to locate the precise endpoints within such delimited full-name utterance that define said constituent name-part utterances and associated pause; and creating an augmented name recognition model based on broad and precise endpoints and said full-name and name part utterances in which any said constituent name-part utterance and any pause in the spoken name input are represented as optional.

3. The voice log-in model of claim 2, wherein the step of performing an endpointing procedure comprises the substeps:

making a first endpointing pass using broad endpoint criteria to delimit the beginning and end of a corresponding full-name utterance; and then making a second endpointing pass using precise endpoint criteria to locate the precise endpoints within such delimited full-name utterance that define said constituent name-part utterances and said associated pause.

4. The voice log-in method of claim 3, wherein said endpointing procedure is dual-pass and energy-based, such that the energy of the spoken name input is computed prior to endpointing.

5. The voice log-in method of claim 3, wherein the first and second endpointing passes are accomplished by the following substeps:

converting the spoken name input into speech energy computed every frame of a predetermined duration;

estimating a speech utterance level parameter, using fast upward adaptation and slow downward adaption, and a noise level parameter, using slow upward adaptation and fast downward adaptation;

determining an utterance detection threshold using the speech utterance level parameter, the noise level parameter, and a predetermined minimum RMS speech energy level;

declaring the beginning of an utterance to be when the speech energy remains above the utterance detection threshold for a predetermined duration;

declaring the end of an utterance to be when (a) the speech energy remains below the utterance detection threshold for a specified duration, and (b) no new utterance beginning is detected for a specified utterance separation duration;

endpointing the speech energy, for the first endpoint pass, with a relatively large value for said specified utterance separation duration to obtain the broad endpoints that delimit the full-name utterance, and endpointing said delimited full-name utterance, for the second pass, again with a small value for the utterance separation duration to obtain the precise endpoints.

6. The voice log-in method of claim 3, wherein the step of creating augmented name recognition models using the broad and precise endpoints and the full-name and name-part utterances comprises the step:

creating an augmented name recognition model for internal utterance endings and utterance beginnings by inserting an additional skip transition into the name recognition model, such that any name-part utterance, or any associated pause, or any combination of both, is made optional, thereby accommodating elimination of said any name-part utterance and unpredictable variations in said any associated pause.

7. The voice log-in method of claim 6, wherein the full-name model is a finite state automaton.

8. The voice log-in method of claim 3, wherein the step of creating augmented name recognition models using the broad and precise endpoints and the full-name and name-part utterances comprises the substeps:

creating a name-part model for each name-part utterance;

creating a full-name utterance model characterizing a sequence of constituent name-part models; and augmenting the full-name model by including in the full-name utterance model between each constituent name-part model a nonspeech model representing nonspeech associated with a pause, such that the pause is made optional, thereby accommodating unpredictable variations in said any pause.

9. The voice log-in method of claim 1, further comprising the step of:

updating a person's name recognition model each time said person is logging in to the system by averaging the spoken name input and the name recognition model, and storing the updated name recognition model in the name recognition model database.

10. A voice log-in method for logging in to a system based on computerized recognition of a spoken name input comprising the steps:

creating an augmented name recognition model from the spoken name input for each person to be enrolled, wherein said augmented name recognition model includes constituent name-part utterances, and also includes any pause in the spoken name input, and wherein said augmented name recognition model represents a portion of said constituent name-part utterances as optional, thereby accommodating elimination of optional name-part utterances, and wherein said pause is also represented as optional, thereby accommodating unpredictable variations in said pause;

storing a name recognition model for each person enrolled in a name recognition model database;

comparing the spoken name input for each person seeking access to the system by voice log-in with the stored name recognition models; and logging a person in to the system if during said comparing, a pattern match is found between the spoken name input and one of the stored name recognition models.

11. The voice log-in method of claim 10, wherein the step of creating augmented name recognition models comprises the substeps:

receiving the spoken name input for each person to be enrolled;

performing an endpointing procedure on the spoken name input to delimit the beginning and end of a corresponding full-name utterance, and to locate the precise endpoints within such delimited full-name utterance that define said constituent name-part utterances and any associated pause; and creating an augmented name recognition model, based on broad and precise endpoints and said full-name and name-part utterances, in which any said name-part utterance and any pause in the spoken name input are represented as optional.

12. The voice log-in model of claim 11, wherein the step of performing an endpointing procedure comprises the substeps:

making a first endpointing pass using broad endpoint criteria to delimit the beginning and end of a corresponding full-name utterance; and then making a second endpointing pass using precise endpoint criteria to locate the precise endpoints within such delimited full-name utterance that define constituent name-part utterances and any associated pause.

13. The voice log-in method of claim 10, wherein the step of creating augmented name recognition models using broad and precise endpoints and full-name and name-part utterances comprises the step:

creating an augmented name recognition model, for internal utterance endings and utterances beginnings that delimit constituent name-part utterances, by inserting an additional skip transition into the name recognition model, such that any name-part utterance, or any associated pause, or any combination of both, is made optional, thereby accommodating elimination of said any name-part utterance and unpredictable variations in said any pause.

14. The voice log-in method of claim 10, wherein the step of creating augmented name recognition models using broad and precise endpoints and full-name and name-part utterances comprises the substeps:

creating a name-part model for each name-part utterance;

creating a full-name utterance model characterizing a sequence of constituent name-part models; and augmenting the full-name utterance model by including in the full-name utterance model between constituent name-part models a nonspeech model representing nonspeech associated with a pause, such that any name-part utterance, or the pause, or any combination of both, is made optional, thereby accommodating elimination of said any name-part utterance and unpredictable variations in said any pause.

15. A voice log-in method for logging in to a system based on computerized recognition of a spoken name input comprising the steps:

receiving the spoken name input for each person to be enrolled;

making a first endpointing pass using broad endpoint criteria to delimit the beginning and end of a corresponding full-name utterance; and then making a second endpointing pass using precise endpoint criteria to locate the precise endpoints within such delimited full-name utterance that define constituent name-part utterances and any associated pause;

creating an augmented name recognition model, based on broad and precise endpoints and the full-name and name-part utterances, wherein said augmented name recognition model represents a portion of said constituent name-part utterances as optional, thereby accommodating elimination of optional name-part utterances, and wherein said pause is also represented as optional, thereby accommodating unpredictable variations in said pause;

storing said augmented name recognition model for each person enrolled in a name recognition model database;

comparing the spoken name input each time a person seeks access to the system by voice log-in with the stored augmented name recognition models; and logging a person in to the system if, while during said comparing, a pattern match is found between the spoken name input and one of the stored name recognition models.

16. The voice log-in method of claim 15, wherein the step of creating augmented name recognition models using broad and precise endpoints and the full-name and name-part utterances comprises the step:

creating an augmented name recognition model, for internal utterance ending and beginnings that delimit constituent name-part utterances, by inserting an additional skip transition into the name recognition model, such that any name-part utterance, or any associated pause, or any combination of both, is made optional, thereby accommodating elimination of said any name-part utterance and unpredictable variations in said any pause.

17. The voice log-in method of claim 15, wherein the step of creating augmented name recognition models using the board and precise endpoints and the full-name and name-part utterances comprises the substeps:

creating a name-part model for each name-part utterance;

creating a full-name utterance model characterizing a sequence of constituent name-part models; and augmenting the full-name model by including in the full-name utterance model between constituent name-part models a nonspeech model representing nonspeech associated with a pause, such that any name-part utterance, or the pause, or any combination of both, is made optional, thereby accommodating elimination of said any name-part utterance and unpredictable variations in said any pause.

* * * * *